United States Patent

Schimpf

[15] 3,660,620

[45] May 2, 1972

[54] TRANSMISSION MEASUREMENT WITH A TWO-COMPONENT SIGNAL

[72] Inventor: Luther G. Schimpf, Holmdel, N.J.

[73] Assignee: Bell Telephone Laboratories, Incorporated, Murray Hill, Berkeley Heights, N.J.

[22] Filed: Dec. 10, 1969

[21] Appl. No.: 883,785

[52] U.S. Cl. .......... 179/175.3
[51] Int. Cl. .......... H04b 3/46
[58] Field of Search .......... 179/175.31 R, 175.3; 332/52 R, 332/52 T

[56] References Cited

UNITED STATES PATENTS

| | | | |
|---|---|---|---|
| 2,962,669 | 11/1960 | Mahler | 332/52 |
| 3,526,729 | 9/1970 | Andrews, Jr. et al. | 179/175.3 |

FOREIGN PATENTS OR APPLICATIONS

| | | | |
|---|---|---|---|
| 1,131,747 | 6/1962 | Germany | 179/175.31 R |
| 1,091,841 | 10/1953 | France | 179/175.31 R |
| 656,188 | 2/1948 | Great Britain | 179/175.31 R |

*Primary Examiner*—Kathleen Claffy
*Assistant Examiner*—Douglas W. Olms
*Attorney*—R. J. Guenther and William L. Keefauver

[57] ABSTRACT

A system for measuring the transmission loss in a telephone customer's loop. A diode network is connected at the customer's premises across the loop. At the central office two alternating current signals are impressed on the loop. One signal is a low frequency, high amplitude signal used to switch the diode network alternately into its conducting and nonconducting states, thus causing the modulation of the second high frequency, low amplitude signal. The sum or the difference frequency is filtered out and measured at the central office.

3 Claims, 2 Drawing Figures

INVENTOR
L. G. SCHIMPF
BY R. O. Nimtz
ATTORNEY

TRANSMISSION MEASUREMENT WITH A TWO-COMPONENT SIGNAL

FIELD OF THE INVENTION

The present invention is directed to transmission measurements and, more particularly, to the measurement of transmission loss in a telephone customer's loop.

BACKGROUND OF THE INVENTION

A recurring problem in the job of providing quality telephone service for the customers of a telephone office is the necessity for the testing of the individual customer's loops to assure that minimum transmission standards are being met at all times. A common method of performing such measurements in the past has been to send a test man to the customer's premises where end-to-end testing is done in conjunction with test personnel at the central office. More recently it has been suggested to place a responsive device at the remote end of the loop, energized from the central office end, and producing a signal measurable at the central office end. The present invention falls in this latter category.

DESCRIPTION OF THE PRIOR ART

In the copending application of F. T. Andrews, Jr. and D. Mitchell, Ser. No. 542,336, filed Apr. 13, 1966, now U.S. Pat. No. 3,526,729 entitled "Transmission Measuring System with Harmonic Generating Means," and assigned to the assignee of the present invention, a system is described in which a diode harmonic generator is connected across the customer's loop at the telephone subset and signal generating and measuring means is located at the central office. At the central office a signal is applied to the loop, and at the subset the harmonic generator produces a harmonic component of the applied signal. The power level of the harmonic signal returning to the central office is indicative of the transmission loss in the loop.

The system just described suffers from several drawbacks. Harmonic generating properties of a number of different diodes of the same type are likely to vary unless care is exercised in their manufacture and selection. Further, because transmission loss often varies with frequency, the value of loss indicated by the described system is approximately the average of the losses sustained at the base frequency and at the harmonic frequency.

It is therefore an object of the present invention to provide accurate measurements which are independent of manufacturing variations in components. This is accomplished by connecting across the loop conductors at the customer's premises a diode network which is utilized in a switching mode whereby the diode network is alternately switched into conducting and nonconducting states. The conducting state makes use of the avalanche breakdown condition of a reverse-biased voltage regulator-type diode. Manufacturing differences have relatively little effect on this switching characteristic of such diodes.

It is a further object to provide an accurate loss measurement at any particular frequency of choice. This is accomplished by using a relatively low frequency signal to switch the diode network on and off, which may be, though not required to be, less than 100 Hz. This switching signal is applied to the customer's loop at the central office. In addition, a transmission test signal is applied to the loop which, because of its relatively low amplitude, does not interfere significantly with the switching action of the diode network. Modulation products are produced by the switching action of the network. Two sidebands appear at the sum and difference of the two frequencies involved, either one of which is measured. Thus the transmitted and the utilized return test signal differ in frequency by an amount equal to the frequency of the switching signal, which may be less than 100 Hz. in this particular instance.

These and other objects will be made evident from the claims appended hereto which fully described the invention. One possible embodiment of the concepts fully described in the claims is shown in the attached drawings.

THEORY OF OPERATION

Figures 1, 2:
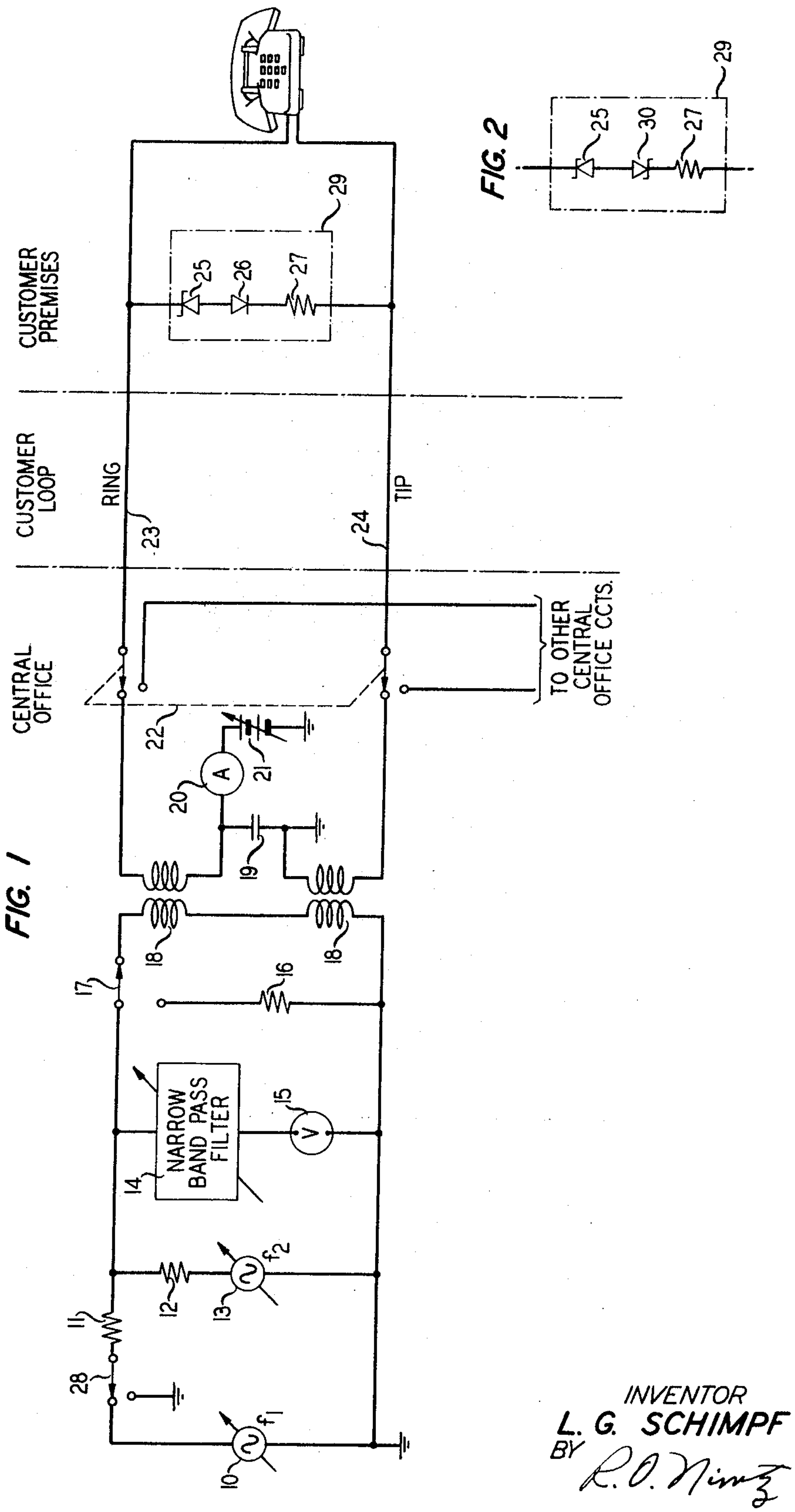
FIG. 1 depicts a system used for measuring transmission loss of a telephone customer's loop.
FIG. 2 shows an alternative embodiment of diode structure 29.

Before describing the detailed function of the various components, a brief description of the theory of operation of the circuit follows with reference to FIG. 1. The telephone is assumed to be on-hook and not to affect the circuit. Diode network 29 is switched alternately on and off by the application of the relatively high-amplitude signal from source 10 and voltage source 21. Voltage source 21 is used to set the operating point in order to assure a 50 percent duty cycle of the network. The conduction of the diode portion of network 29 is therefore assumed to alternate between 1 and 0. This function is described by the series:

$$S(t) = ½ + 2/\pi \cos\omega_1 t - 2/3\pi \cos 3\omega_1 t + \ldots \qquad (1)$$

where $S(t)$ is the switching function of diode network 29, and $\omega_1$ is the angular frequency of the switching source 10 with $\omega_1 = 2\pi f_1$, where $f_1$ is the frequency of source 10 measured in Hz. The application of a transmission test signal from source 13 results in an additional voltage $V(t)$ appearing across the terminals of network 29 with frequency $f_2$ or angular frequency $\omega_2 = 2\pi f_2$. Where $V$ is the peak amplitude, $$V(t) = V \sin\omega_2 t. \qquad (2)$$

The current flow $I(t)$ through the network is then given by $$I(t) = (V(t)/(R_{27})\ S(t) \qquad (3)$$

where $R_{27}$ is the resistance of resistor 27 shown in FIG. 1. Substituting equations (1) and (2) into equation (3), $$I(t) = (V)/(R_{27}) \sin\omega_2 t\ (½ + 2/\pi \cos\omega_1 t - ⅔\pi \cos 3\omega_1 t + \ldots ). \qquad (4)$$

The second term of this expression yields the sidebands of interest.

$$I(t) = (V)/(\omega R_{27})\ 2(\sin\omega_2 t \cos\omega_1 t) \qquad (5)$$

Applying the trigonometric identity:

$$2(\sin x)(\cos y) = \sin(x+y) + \sin(x-y) \qquad (6)$$

we obtain $$I(t) = (V)/(\pi R_{27}) \sin(\omega_2 + \omega_1)t + (V)/(\omega R_{27}) \sin(\omega_2 - \omega_1)t \qquad (7)$$

The diode network 29 is thereby seen to produce signal sidebands at the sum and difference frequencies of the switching and transmission testing sources 10 and 13.

The returning signal level of either the sum or the difference frequency sideband is measured with voltmeter 15 by tuning the filter 14 to the appropriate frequency. This return level can be used to determined the loop loss.

At the frequency $f_2$, the customer's loop attenuates the transmission test signal sent out to the customer's premises by an amount $L_L$ measured in decibels. Since the return sideband signal varies only slightly in frequency from the transmitted frequency of $f_2$, the loop will exhibit approximately the same loss to the return signal sent from the customer's premises back to the central offic—that is, $L_L$. In addition, the diode network 29 converts only a portion of the incident $f_2$ power into power at the sideband frequency. This can also be expressed as an equivalent conversion loss measured in decibels, $L_C$. The expression for the total equivalent loss $L_T$ experienced by the round trip signal is then given by:

$$L_T = 2L_L + L_C. \qquad (8)$$

Solving this equation for the loop loss, $$L_L = L_T – L_C .\ 2 \qquad (9)$$

In the above equation, the loop loss $L_L$ is given in terms of the total loss $L_T$, which may be determined from the measurements performed with apparatus such as that shown in the accompanying FIG. 1 embodying the inventive concepts described and claimed wherein and $L_C$ the conversion loss of the diode network 29 located at the customer's premises. The value of $L_C$ will depend on the values and characteristics of the components 25, 26, and 27 making up the network 29. $L_C$ can be conveniently determined by direct measurement, that is, by applying the switching and transmission test signals directly to the terminals of a network such as that shown as element 29 in the figure and performing a direct loss measurement as taught herein without intervening customer's loop. For a particular set of component values $L_C$ was found to have been approximately 9.0 decibels of loss, with relatively small variations among a number of different networks constructed of similar components. This loss measurement is relatively independent of the measurement frequency corresponding to the frequency of approximately $f_2$ in the present description of operation. Equation (9) therefore becomes:

$$L_L = L_T - 90/2 \qquad (10)$$

Where it is understood $L_L$ is the transmission loss of the customer's loop given in decibels, $L_T$ is the total loss measured in accordance with the practice of this invention, also given in decibels, and further that equation (10) is accurate only for a particular set of values for the components of the embodiment of FIG. 1.

DETAILED DESCRIPTION OF THE DRAWINGS

We return now to FIG. 1 for a more detailed description of this embodiment of the invention. In FIG. 1 signal generator 10 supplies low frequency $f_1$ switching signal to the circuit through switch 28 and resistor 11 while signal generator 13 supplies test frequency $f_2$ signal through resistor 12. Source 10 is preferably variable in amplitude, while source 13 is preferably variable in amplitude and frequency. Resistors 11 and 12, and switch 28 are advantageously arranged to provide a relatively constant impedance signal source of either one ($f_2$) or two ($f_1$ and $f_2$) frequency components. The impedance "seen" looking into the common terminal of resistors 11 and 12 is simply the parallel impedance of resistors 11 and 12 under the common assumption of a very low internal impedance for both sources 10 and 13. The parallel impedance of resistors 11 and 12 is advantageously chosen to be approximately equal to the nominal impedance of a telephone customer's loop (approximately 900 ohms) when reflected through transformer 18, in order to affect an approximate maximum of power transfer from sources 10 and 15. Also, it is desirable to measure the loop loss at the 900 ohm impedance level since that is the normal impedance encountered in telephone service. A number of different arrangements obvious to those skilled in the art could be utilized to affect the general purposes described for components 10, 11, 12, 13, and 28 without materially altering the invention embodied in the figure.

Narrow bandpass filter 14 is variable across approximately the same range as source 13 and is selectively tuned to pass a desired narrow band of frequencies on for measurement by alternating current voltmeter 15. Switch 17 connects resistor 16 across the terminals of the signal sources and voltmeter for calibration of the system or alternatively connects balanced transformer 18 across the terminals while loss measurements are being performed. The value resistor 16 will likewise advantageously be chosen to be of approximately the same value as the parallel value of resistors 11 and 12. Voltmeter 15 and filter 14 have relatively high impedance in order that the terminal impedance determined by resistors 11 and 12 or by resistor 16 not be disturbed.

Balanced transformer 18 isolates the direct current portion of the circuit from the signal sources during operation of the system. Feed-through capacitor 19 provides a low impedance path for the alternating current components impressed on the customer's loop. Variable direct current source 21 and direct current meter 20 are used to provide current biasing of the diode network 29 composed of diodes 25 and 26 and resistor 27. Switch 22 connects the customer's loop to either the central office portion of the transmission measuring system or alternatively to the other central office circuits which provide the usual telephone service.

The customer's loop comprising the ring conductor 23 and the tip conductor 24 extend from the central office out to the customer's premises where the diode network 29 is connected across the tip and ring conductors. Diode 25 is of the regulator type with a reverse breakdown voltage which may be in the range of 75 volts. Diode 26 is of the rectifier type which may have a reverse breakdown voltage in the range of 600 volts. Diodes 25 and 26 are connected in series, across the customer's loop, with the cathode of diode 25 and the anode of diode 26 respectively oriented toward the ring conductor. Resistor 27 is connected in series with the combination of diodes.

OPERATION OF THE ILLUSTRATIVE EMBODIMENT

Details of the operation of the embodiment shown in FIG. 1 will not be presented. The diode network 29 is connected across the customer's loop at the customer's premises at some convenient location such as the telephone protector block and is arranged to have a minimal effect on the operation of normal telephone service. During normal operation, switch 22 or some similar device such as a relay connects the central office end of the customer's loop to the central office circuits which give normal telephone service. Talking voltages on a telephone loop of this type run typically in the range of 2 to 5 volts in either direction; therefore, neither diode 25 nor diode 26 will conduct current. When the loop is idle (on-hook) −48 volts resides on ring conductor 23 and diode 26 will prevent network 289 from conducting.

Diode 25 is a voltage regulator diode which will not conduct in the reverse direction until the voltage reaches some critical value which, for purposes of this description, is assumed to be 75 volts, but is in no way limited to that value. After this critical value is reached, diode 25 will conduct in the reverse direction with very low impedance, but always maintaining the critical voltage across its terminals, 75 volts in this example. Diode 26 is a rectifier-type device and is not necessarily of the voltage regulator type. Reverse breakdown voltage for this diode may be somewhat higher, but the value is not critical. A reverse breakdown of 600 volts is typical for rectifier diodes used in electronic circuits and this value would not be unsuitable for this application.

During the ringing of the customer's telephone line, typically an alternating current of some 88 volts RMS, corresponding to a peak voltage of about 124 volts, is applied to the ring conductor 23 of the customer's loop. This voltage is superimposed on top of negative 48 volts direct current. The tip conductor is typically grounded at the central office during ringing. The voltage on the ring conductor may thus swing from about +76 volts to −172 volts during ringing. On very short customer loops, approximately the full voltage swing reaches the customer's premises, and diode 25 may be driven into its conduction state for a short period of time during the positive portion of each cycle of the ringing current without materially affecting service. On longer loops the resistance of the loop itself reduces the voltage swing reaching the customer's premises during ringing, and diode 25 may never conduct during any portion the negative swing of the ringing voltage and will prevent current flow through network 29 at that time.

FIG. 2 shows another embodiment which would be suitable for network 29. Element 26, a rectifier-type diode has been replaced by a second voltage regulator-type diode 30 connected with its polarity reversed with respect to diode 25. The reverse breakdown voltage of diode 30 should be of such a value to prevent any significant effect on normal telephone service. For the voltages given in the example described, a reverse breakdown voltage of 170 volts would not be unreasonable for diode 30. Operation of the circuit is not materially altered with the use of the FIG. 2 network 29.

When it is desired to make a transmission measurement on the customer's loop, switch 22 is operated to disconnect the customer's loop from the central office circuits which give telephone service and to connect the loop to the measuring circuit. Prior to performing the actual measurement, certain initial adjustments are performed. Switch 28 us operated to connect resistor 11 to ground, and switch 17 is operated to connect the filter 14 to calibration resistor 16. Signal source 13 is tuned to the frequency at which the transmission measurement is to be made—$f_2$—and filter 14 is tuned to the same $f_2$ frequency. The amplitude of source 13 is adjusted to some convenient reference level on voltmeter 15. Switch 17 is then operated to connect filter 14 to transformer 18 and to apply $f_2$ to the customer loop. Voltage source 21 is then adjusted until a small current flow is detected in ammeter 20, indicating that regulator diode 25 is reversed biased slightly greater than its breakdown voltage. A measurement in the order of 0.5–1.0 milliampere is suitable for this purpose in the particular circuit embodiment shown.

The next step is to operate switch 28 to connect resistor 11 to switching source 10. The level of switching signal $f_1$ is adjusted until an increase in current flow through ammeter 20 is detected of such a magnitude to indicate that regulator diode 25 is being switched on and off with approximately a 50 percent duty cycle. This value can be determined experimentally for any particular component values in the network 29. An increase of 3–4 milliamperes is suitable for this purpose in the particular circuit embodiment shown. Filter 14 is now tuned to either the upper or lower sideband frequency, that is, either frequency $f_2 + f_1$ or frequency $f_2 - f_1$. The level of the chosen sideband is read from voltmeter 15 and by comparison with the reading at $f_2$, the total loss $L_T$ is calculated in decibels from $$L_T = 20 \log_{10} \text{Voltage at } f_2 / \text{Voltage at } f_2 \pm f_1. \quad (11)$$

From this value the loop loss at frequency $f_2$ is determined by the use of equation (10). Alternatively, the scale of voltmeter 15 may be calibrated to read directly the loop loss without the necessity of calculation.

Although the above description has been directed principally to the invention as it might appear in the environment of a telephone customer's switching loop where it has evident utility, the underlying inventive concept could be applied to other types of transmission lines. By placing a threshold-responsive device at the far end of a transmission line and by arranging its threshold to be above the signal level which arises during normal utilization of the transmission line, use of the transmission line will not be interfered with. The threshold-responsive device, however, is available whenever necessary for testing purposes by applying a two-component signal to the near end of the transmission line, one switching the threshold-responsive device "on" and "off" according to the teachings of this invention, and the other signal acting as a carrier from which modulation produces are derived and measured at the near end.

It is further without the contemplation of this invention that the threshold-responsive device may consist of a two or more terminal semi-conductor device with threshold-responsive characteristics suitable for utilization in this invention. It is not therefore necessary that the diode network 29 be composed of individual elements, but for some purposes may comprise a single semi-conductor device with appropriate characteristics and not depart from the spirit or scope of the invention described herein.

What is claimed is:

1. Apparatus comprising:

a telephone customer's loop having a near and a far end;

voltage regulator diode means connected across said loop at said far end, said diode means having a reverse breakdown voltage threshold not substantially less than the peak ringing voltage which occurs during normal telephone use of said loop with polarity tending to reverse bias said diode means;

means at said near end for applying an alternating current switching signal of frequency $f_1$ to said loop, wherein said switching signal switches said diode means on and off at frequency $f_1$;

means at said near end for applying an alternating current transmission signal of frequency $f_2$ to said loop, wherein said means for applying said switching signal comprises means for generating said switching signal asynchronously with respect to said transmission signal and with sufficiently greater amplitude than the amplitude of said transmission signal that said transmission signal has substantially no effect on the capability of said switching signal to switch said diode means on and off, and with sufficiently low frequency that the transmission loss of said loop at frequency $f_2 + f_1$ or frequency $f_2 - f_1$ is not substantially different from that at frequency $f_2$;

means at said near end for adjusting the operating point of said diode means such that said switching signal will switch said diode means on and off with a duty cycle of approximately 50 percent; and means at said near end for selectively measuring the amplitude of a signal at frequency $f_2 + f_1$ or frequency $f_2 - f_1$.

2. Apparatus as in claim 1 wherein:

said diode means further comprises rectifier diode means and resistor means in series connection with said regulator diode means, wherein said rectifier diode means and said regulator diode means are oriented with their forward current flow directions in opposition.

3. Apparatus as in claim 1 wherein:

said diode means further comprises second regulator diode means with reverse breakdown voltage threshold not substantially less than the peak ringing voltage which occurs during normal telephone use of said loop with polarity tending to reverse bias said second regulator diode means and resistor means in series connection with said regulator diode means, first said regulator diode means and said second regulator diode means being oriented with their forward current flow directions in opposition.

* * * * *